July 26, 1938.  M. A. BALAAM  2,125,252
IRRIGATION PIPE TRANSPORTING MACHINE
Filed May 6, 1937  3 Sheets-Sheet 1
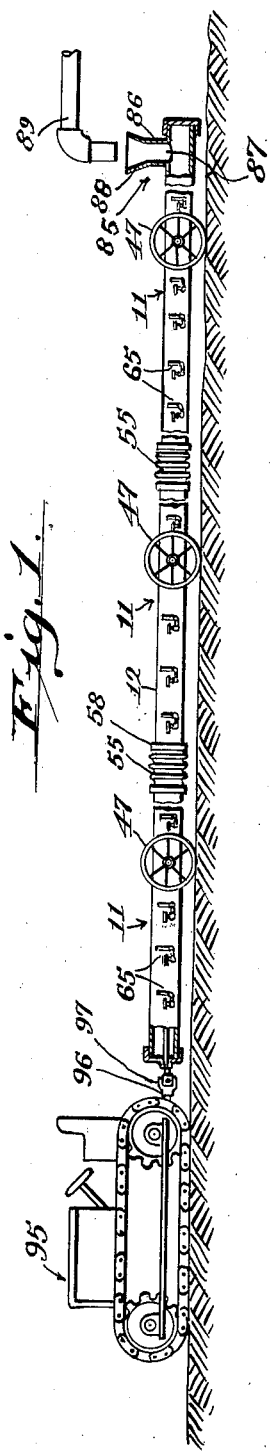
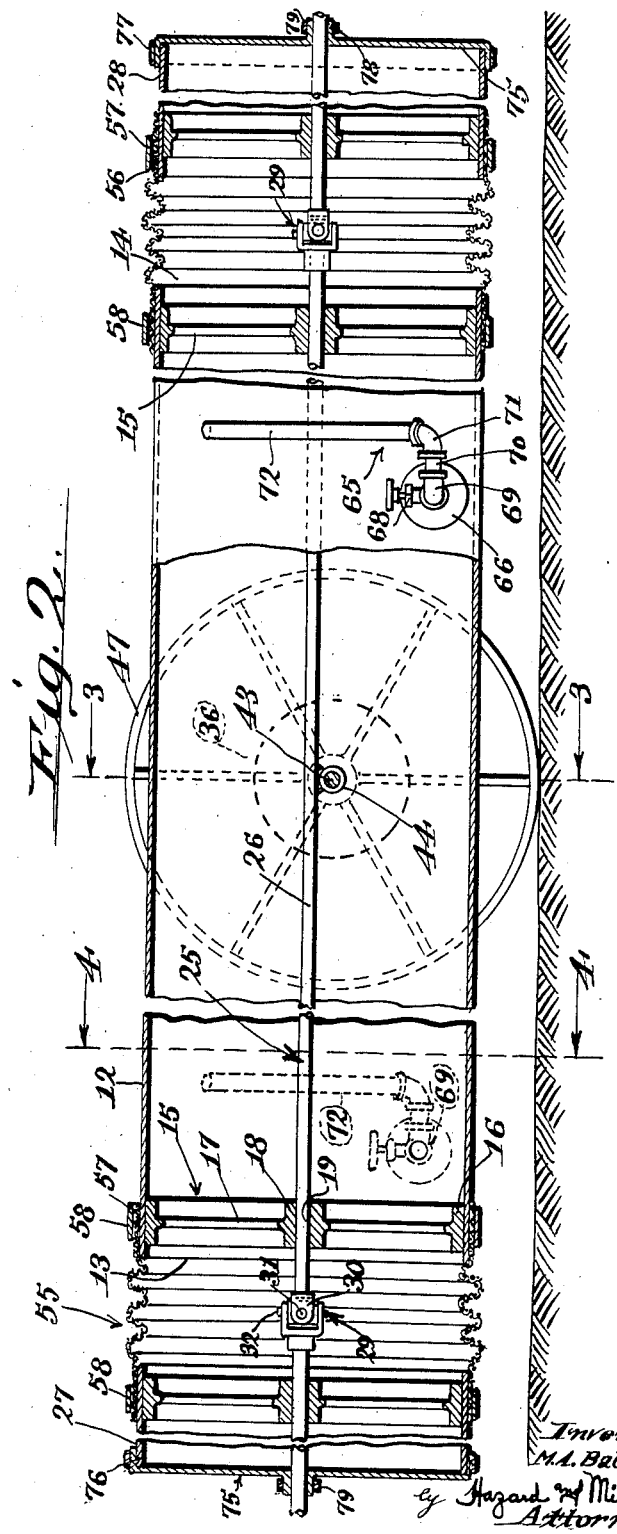
Inventor
M. A. Balaam
by Hazard and Miller
Attorneys Inventor
M. A. Balaam
by Hazard and Miller
Attorneys July 26, 1938.   M. A. BALAAM   2,125,252
IRRIGATION PIPE TRANSPORTING MACHINE
Filed May 6, 1937   3 Sheets-Sheet 3
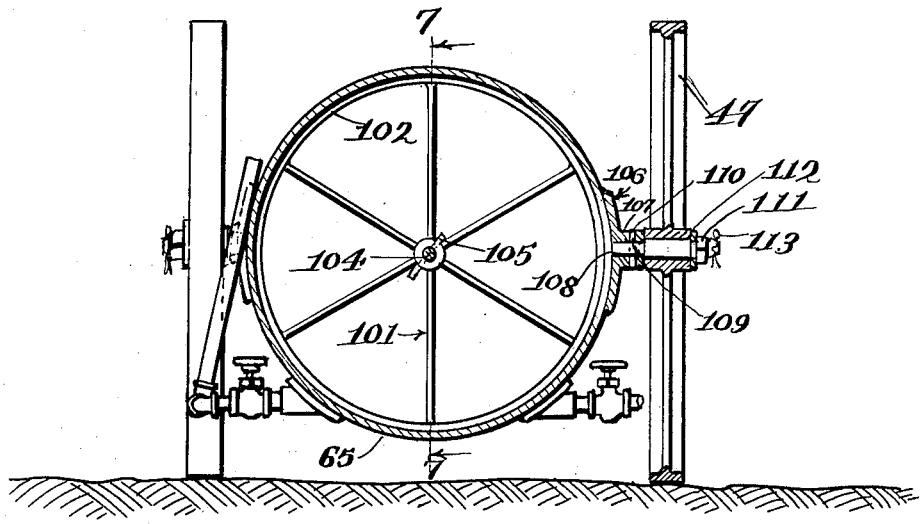
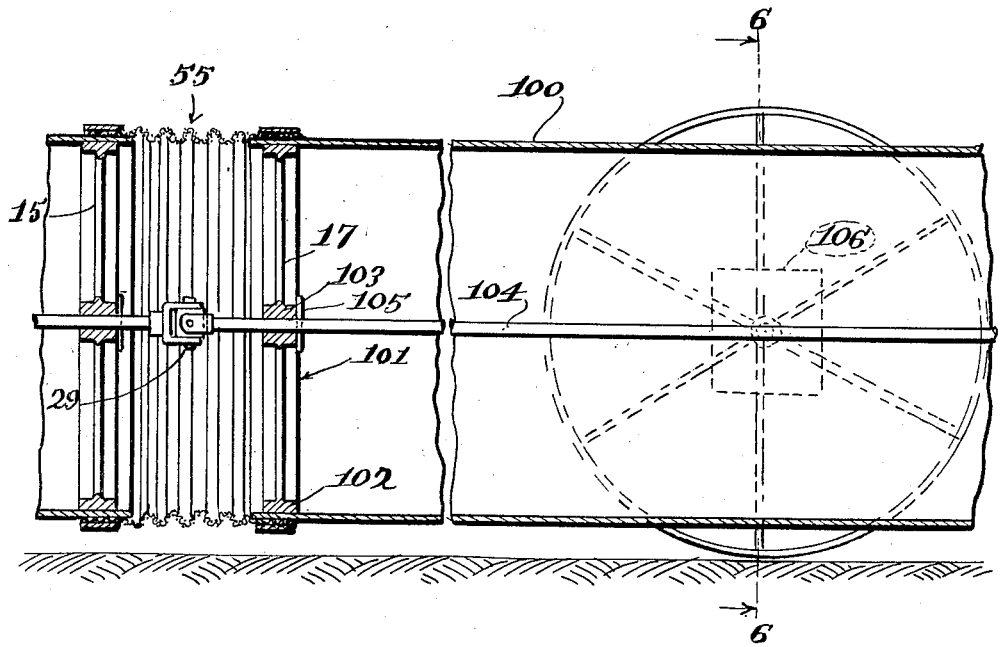
Inventor
M. A. Balaam.
by Hazard and Miller
Attorneys.

Patented July 26, 1938

2,125,252

UNITED STATES PATENT OFFICE 2,125,252

IRRIGATION PIPE TRANSPORTING MACHINE

Maurice Aaron Balaam, Lompoc, Calif.

Application May 6, 1937, Serial No. 141,118

20 Claims. (Cl. 280—33.2)

My invention relates to a machine or apparatus by which irrigation pipe may be moved while a length of pipe is connected together in a direction longitudinal of the pipe to locate such pipe in a desired position in a field or orchard to supply water for irrigation.

A characteristic of irrigation pipe for supplying water to be spread either in furrows or over a field or orchard for irrigation is that the pipe itself must be quite light and hence a thin walled structure. Also it is necessary to have a flexibility at the joints so that when connected lengths of pipe are being pulled or towed for placement in a desired position this necessitates a flexibility for turning on curves in a horizontal plane. It is also necessary to have flexibility for movement in a vertical plane due to the ground being more or less uneven and not of constant level or constant slope. Manifestly the two angles of flexing must be combined. It has therefore been the custom to provide the pipes with a so-called flexible type of joint, involving various types of ball and socket pipe connections. These ball and socket connections must also be made of comparatively thin metal to have light weight.

Where the towing stresses are through the flexible, such as ball and socket joints, it is requisite that these be very strong and also that the pipe be of greater strength in order to transmit the towing stresses entirely by the flexible joints and the pipes. If the joints and pipes be of thin metal they would become distorted and misshapen and not function properly. In the prior type of moving the pipe, the pipe is mounted on dollies or wheels for support and transportation over the ground surface.

A main object and feature of my present invention involves a combined construction of pipe lengths assembled into a string of irrigation pipe of the desired length in which the towing stresses are not carried in any manner by the wall of the pipe itself or the flexible joints but such towing stresses are carried substantially entirely by tow-rods or bars which extend preferably axially through the center of the individual pipes and of the assembled lengths of pipe. A further object therefore of my invention is the construction of the individual pipe lengths with a towing rod or bar mounted therein preferably in the axial center, each bar having provision for a universal joint at its opposite ends for connection to adjacent pipe. Therefore when a series of the pipe lengths are connected together by their individual axial tow bars and the universal joints at the end, the towing stresses are transmitted through the tow bars and the flexible joints. Therefore the pipes may be made of quite light material as they are not subjected to bending or pulling stresses. A further detail feature concerning the assembly of a pipe length and its tow bar, consists of having a spider construction built into the pipe adjacent its opposite ends, each spider having a hub through which the tow bar extends. The tow bar may be attached to one or other of these hubs or both or being unattached for a slight sliding movement but connected to the pipe in some other manner.

Another object and feature of my invention is mounting each pipe length for transportation on a dolly carriage structure having a pair of wheels, such wheels being mounted on an axle and the axle extending through the pipe preferably substantially through a horizontal diameter. The axle is of a type from which the wheels may readily be removed so that axle may be entirely disassembled from the pipe. Thus each dolly having a pair of wheels is only required to support one length of pipe.

Another characteristic of my invention is in connecting the tow bar of each pipe length with the axle of the dolly or carriage so that the towing bar in pulling a string of connected pipe transmits the towing stresses to the axle and thus to the wheels, this involving but little strain on the thin walls of any pipe length. Considered in more detail in this respect the tow bar for each pipe length preferably has a transverse axle support connected thereto, such axle support having a horizontal opening or perforation through which the axle may extend. At each side of the pipe I preferably employ saddles with integral hubs welded to the pipe so that after removal of one wheel the axle may be inserted through the hubs, horizontally through the pipe engaged in the axle support and then by replacement of the removed wheel the pipe length may be supported. In order to prevent leakage suitable packing and a packing gland engages the axle length passing through each hub. It is preferable to clamp the axle to the hub so that it is non-rotatable and the wheels rotate on the axle.

As in my present construction the flexible joints between contiguous pipe lengths is not required to transmit any pulling stresses. Another feature of my invention is in the flexible joint and the connection. This is preferably by providing a sleeve of flexible material such as rubber, fabric or the combination of rubber and fabric attached to contiguous pipe lengths by a clamp, there being sufficient slack in each joint sleeve to permit an angular turn of one pipe length in reference to another. With this construction the universal joints connecting the tow bars are preferably located between adjacent pipe ends and thus enclosed by the flexible sleeves.

Another detail feature of my invention resides in connecting the axles and the wheels to each pipe length at substantially one-third the length of each individual pipe from its rear end. Thus when a series of pipe lengths are connected together by the universal joints of the tow bars, the pipes follow more or less closely in the same track when turning a corner or making a curve in change of direction when being towed from one part of a field or an orchard to another.

Another detailed feature of my invention resides in the water connections from adjacent the bottom of each pipe length for discharging water into irrigation ditches or for spreading over the ground surface. This employs outlets from the pipe with a suitable valve for each outlet and a pivoted discharge pipe, this pivoting on a longitudinal axis so that the discharge pipe may incline downwardly from the horizontal for discharging water or be swung into a more or less upright position and inclined against the pipe during the transportation of pipe lengths from one position to another. With my invention I may supply the water for irrigation in any suitable manner to one end of a string of irrigation pipe in which case the end remote from the feeding or charging end is preferably closed in order to maintain the series of pipes full or substantially full of water. Even with the flexible type of sleeve the lengths of pipe may carry water at a few pounds pressure per square inch, this depending on the strength of the flexible sleeve joints between the individual pipe lengths.

In a simple construction saddles with stub axles may be secured to the outside of the pipe, the wheels being mounted on these stub axles in which case the tow-bar of a pipe may have means to abut against one of the spiders to transmit the towing stresses from the bar through the spider to the pipe and wheels.

My invention is illustrated in connection with the accompanying drawings in which:

Fig. 1 is a side elevation of an assembly of irrigation pipe illustrating the manner of towing the pipe string for transportation together with a diagram illustrating a suitable water supply.

Fig. 2 is a side elevation partly broken away on a vertical diametrical longitudinal section to illustrate a single pipe length and connections to adjacent pipes.

Fig. 6 is a vertical transverse section on the line 6—6 of Fig. 7 showing a modification in which stub axles for the wheels are mounted on the outside of the pipe.

Fig. 7 is a longtiudinal section of Fig. 6 on the line 7—7, taken in the direction of the arrows.

Figure 3:
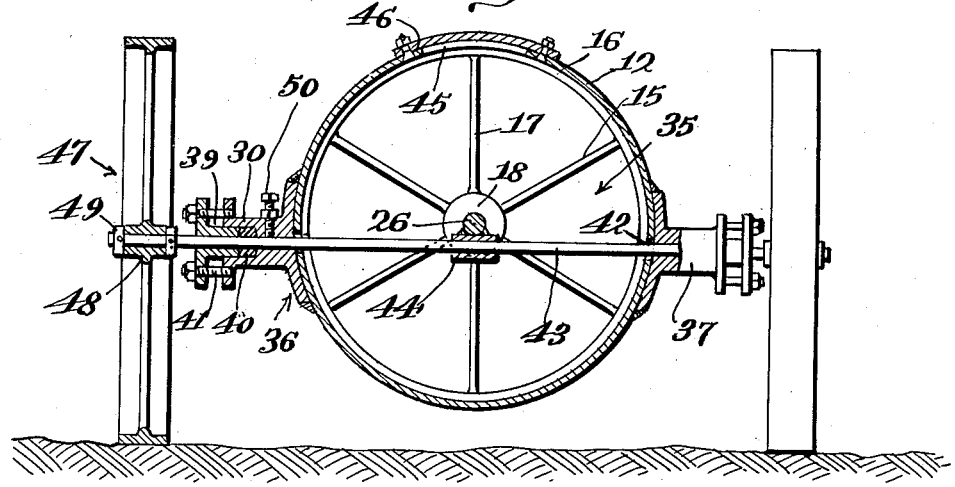
Fig. 3 is a vertical transverse section on the line 3—3 of Fig. 2 in the direction of the arrows, the axle and one of the wheels and part of a hub being shown in elevation.

Referring first to the construction of an individual pipe length designated by the numeral 11, this has a thin preferably cylindrical pipe 12 of any suitable diameter to carry the requisite amount of water. The pipe length is illustrated as terminating at 13 and 14 considered as the front and rear of such pipe length. Each pipe end is preferably transverse to the axis of the pipe. Located adjacent each pipe end there is a spider assembly 15, such assembly having an internal ring 16, a series of spokes 17 and a central hub 18, the hub having an opening 19 therethrough. Each spider is preferably secured to the pipe by welding the ring 16 to the inside of the pipe. These spiders thus operate as a stiffening structure at each end of the pipe. It is manifest that if desired if the pipes are long and to carry a heavy weight of water, that additional stiffening spiders could be utilized.

The towing structure designated by the assembly numeral 25 consists of a tow bar or a rod 26 of a suitable diameter and material having sufficient strength to transmit the towing stresses. This rod is inserted from one end of the pipe through the openings 19 in the hubs 18 in each spider and preferably has a somewhat loose fit in the opening 19. It is not intended that the rods be secured to these spiders to provide for expansion and contraction and also any slight elongation due to the towing. Adjacent pipe sections designated as 27 and 28 each have a similar rod to the rod 26 extending through similar spiders and these adjacent rods are connected by a universal joint 29. Each is provided with a socket 30 which may be secured to the projecting end of a tow rod 26 and is arranged to have a horizontal pivot 31 and a vertical pivot 32. These joints may be of the yoke type and thus permit angular movement in any direction.

The axle and wheel assembly designated by the numeral 35 utilizes substantial saddles 36 which are welded to the outside of the pipe. Each saddle has an integral hub 37 and is provided with a packing socket 38 and a packing gland 39 with packing 40. The gland is tightened by bolts 41. The pipe 12 in alignment with the hubs has perforations 42 through which the axle 43 may be inserted when one of the wheels is removed and the packing gland and packing also removed for inserting the hub through the axle. Connected to the tow bar section there is a short towing sleeve 44. Such sleeve is preferably welded to the rod and is transverse to the rod. The tow bar or rod 26 is preferably in the longitudinal axial line of the pipe and therefore the sleeve 44 is offset from the center preferably below such center. The sleeve is intended to be positioned horizontal so that the axle may be fitted through the sleeve. In order to guide and manipulate the axle the pipe has a hand-hole opening 45 positioned above and in proximity to the axle. A hand-hole cover 46 forms a closure for this when the pipe is in operation. Each wheel 47 is removable from the axle, each wheel having a hub 48 held in place by a collar 49 on each side which may be secured to the axle by a cotter pin or bolt. The axle is prevented from rotation by a clamping set screw 50 in one or other of the hubs 36 or in both. This holds the axle properly centered with the wheels equally spaced. Then when the packing glands with the packing are clamped down, leakage is prevented along the axle. As the axle does not rotate, no provision need be made for a rotational movement in the packing or packing gland. It will be noted that the wheels are of larger diameter than the pipe or else set sufficiently below the horizontal center of the pipe so that the lowermost parts of the pipe is elevated an adequate distance above the ground level. Of course it will be apparent that if desired the axle may extend through the pipe on a horizontal line through a horizontal diameter in which case it would be necessary to have the tow bar 26 offset from the axial center of the pipe or else provide the towing sleeve 44 extending diametrically through the tow bar.

In order to provide for angular turning of the pipe and to transmit water from one pipe length to another, flexible connecting sleeves designated by the assembly numeral 55 are utilized. When the pipe lengths are in longitudinal alignment each sleeve presents a somewhat bellows construction 56 and is made of a flexible material such as fabric, a combination of rubber and fabric or a pure rubber sleeve. The ends of each sleeve 57 is fitted over the end of each pipe length approximately outside of the spider and the ring 16 of such spider. These ends are then secured tightly to the pipe length by ring clamps 58. These may be tightened in any suitable manner to prevent leakage around the sleeves. It is to be understood that these sleeves are sufficiently loose between adjacent pipe lengths that under no circumstances are they subjected to a pulling tension. They, however, are sufficiently loose and flexible that an angular turn of the pipe lengths may be made until for instance, adjacent end edges such as 13 and 14 would contact.

Figure 5:
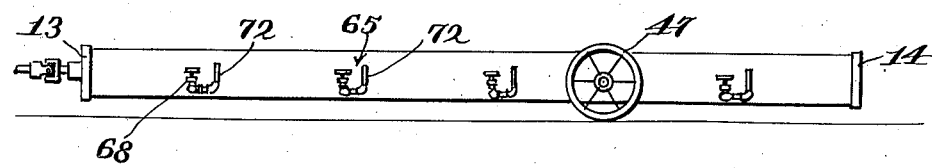
Fig. 5 is a side elevation on a reduced scale of a single pipe length to illustrate the positions of the wheels.

It is desirable that the axle and wheels be mounted about two-thirds of the distance from the front end towards the rear end of each individual pipe length. Thus in Fig. 5 the front end of a pipe is indicated at 13 and the rear end at 14. Thus two-thirds of the pipe length is between the front end 13 and the axle and about one-third between the axle and the rear end 14. This arrangement is for the purpose of having the pipes tow when making turns in approximately the same track as the first pipe.

Figure 4:
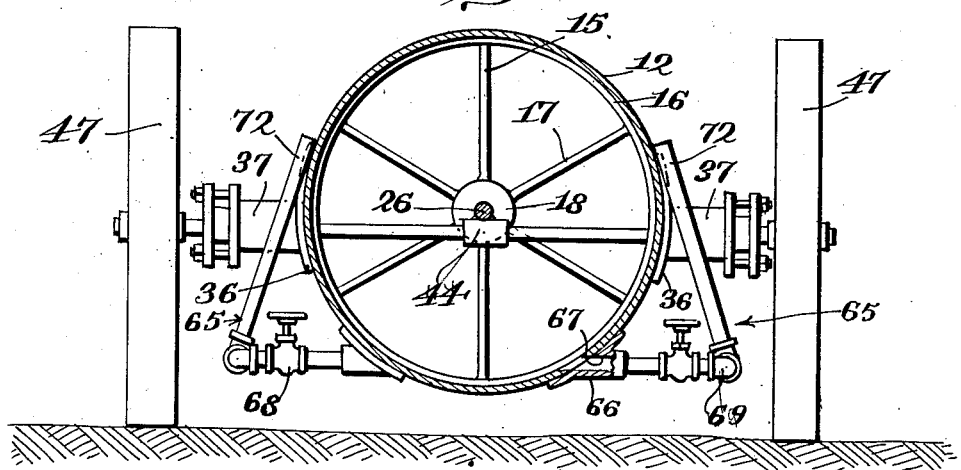
Fig. 4 is a vertical transverse section on the line 4—4 of Fig. 2 in the direction of the arrows.

The water distribution outlets designated by the assembly numeral 65 preferably include cast metal outlet fittings 66 welded to the pipe preferably adjacent the bottom on each side, the pipe having openings 67 communicating therewith. These fittings may be arranged directly on opposite sides of the pipe or staggered and there would be a sufficient number to provide for proper distribution of the irrigation water into furrows or for spreading off the ground. To each fitting there is connected a valve 68 and from each valve there is an elbow 69. Connected to each elbow is a coupling or nipple 70 and to the opposite end of such is connected a second elbow 71 from which extends straight discharge pipes 72. As the couplings may turn or the elbow turn, the pipes 72 may occupy the upper positions shown in full lines in Fig. 4 when the pipe is being transported or may be inclined downwardly to the dotted positions for discharging water. It will be noted that the pipes 72 swing in vertical planes transverse to the axis of the pipe and when the pipes are being transported rest against the outside of the pipe.

At the two ends of a string of pipe coupling, for instance as shown in Figs. 1 and 2, it is necessary to have an end closure. This may be as shown in Fig. 2 in which a strong fabric or flexible rubber end cover 75 has an outer peripheral edge 76 turned over the end of the pipe and held by a clamp 77. A reduced neck portion 78 is fitted around the projecting end of the tow bar 26 and secured by a clamp 79. This makes a simple and readily appliable end closure. However, if desired, the end closure may be a metal cap but it is desirable to have the tow bar extend beyond the cap for towing purposes. It is necessary therefore to have a watertight connection between the cap and the tow bar.

For supplying water one of the end pipes may be provided with a supply connection 85 (note Fig. 1). This includes a stand pipe 86 extending upwardly from an opening 87 in the upper portion of a pipe. This stand pipe has a flared or funnel shaped upper portion 88 to receive water fed by a supply pipe 89.

When a series of pipes are connected as above described, they may be towed by a towing vehicle 95 which is illustrated in Fig. 1 as a tractor having an endless type of track. This tractor has a tow bar 96 with a universal joint connection 97 to the projecting end of a tow bar extending beyond the endmost pipe. As above described in connection with Fig. 5, the forward end of a series of pipes are connected to the trailing end of the pipe immediately in front or to the tractor. This locates the supporting wheels about one-third of the length of each pipe from the rear end. It is manifest that in straight line travel of the tractor that the series of pipes follow in alignment. The succeeding wheels of the dolly supporting each pipe thus follow in the same track. The usual procedure is to line up the pipe longitudinally of the field or ground area to be irrigated. The tractor may be disconnected if desired and then after supply of the water this may be shut off, the pipe drained, the spreader pipes 72 turned upwardly and the tractor connected for transportation of the pipe assembly. In making turns for instance a right angle turn should be made in a sweeping curve of considerable radius but on account of the rear end of each pipe being forced in the opposite direction to the leading end at the turn, succeeding pipes are caused to follow approximately in the track of the tractor and of the leading pipe. That is, the dolly wheels of the trailing pipes follow approximately the same track as the dolly wheels of the first pipe of the series. The flexible joints or sleeves 55 allow turning at corners and also flexing up and down over irregular ground or on slopes or hillsides. The pipe may then be lined up in another position with the pipes in longitudinal alignment for further irrigation. It will also be apparent that the pipes may be arranged either in a curve or a somewhat zigzag manner for irrigation. Thus to a certain extent the pipe line may be made to conform to the contour of the ground for spreading water for surface irrigation.

It will thus be seen that a characteristic of my invention is that in towing a string of connected irrigation pipe that the towing stresses are carried entirely by the tow bar 26 and the universal joint connections between adjacent bars. Thus no towing stresses are carried by the thin walled pipe. It will be apparent that each pair of dolly wheels only has to support the weight of one length of pipe and the water carried thereby but while the device is being transported the string of pipe is empty of water. Hence the assembly is quite light. It will be apparent also that other types of flexible joints between the pipes may be utilized. For instance, a ball and socket type of connection might be an equipment of each pipe end but when using the tow bar with the universal joint connections between each bar such ball and socket joints if used would not be subjected to towing stresses.

In the construction of Figs. 6 and 7 each individual pipe section 100 has a spider 101 secured adjacent each end, the spiders being indicated as having a ring 102, a central hub 103 and connecting arms or spokes 17. The tow bar 104 extends through these hubs, this being preferably a straight round bar, adjacent bars being connected by a universal joint 29. At the front or towing end a contact pin 105 is inserted through a transverse perforation in the tow-bar and is adapted to engage the front spider of a pipe length. The tow bar rides loosely through the spider at the rear end of the pipe and thus allows for contraction and expansion and the pull from the tow bar to the pipe being transmitted at the forward end of the pipe.

In this construction it is preferable to provide a pair of saddles 106 secured to the outside of the pipe by rivets or welding and each saddle has an integral hub 107 with a socket 108 therein. A hard metal stub axle 109 is fitted in the socket and secured by a pin 110 or the like. The wheels 47 are mounted on this stub axle and may be held in place by a nut 111 on a threaded end of the stub axle, the nut engaging a washer 112, such nut being secured by a cotter-pin 113 through the end of the stub axle.

In this construction it is advisable to have the stub axles diametrically opposite and on a horizontal diameter of the pipe, therefore the stub axles may be in the same plane as the tow-bar. Adjacent pipes are connected by the flexible connecting sleeves 55, the wheels are mounted preferably adjacent the rear end of each pipe as about at the two-third distance from the forward to the rearward end of the pipe length. The pipes are provided with distribution outlet assemblies 65. It will be understood however that any type of outlets for water may be connected to the pipe at different positions longitudinally of each pipe length. In this simpler construction of Figs. 6 and 7 the individual pipe lengths are hooked together forming a long string of pipe such as shown in Fig. 1, the two end pipes are closed at their extreme ends and provision is made for supplying water to one end of the connected string of pipes. The structure may be towed by using a tractor such as that indicated by the towing vehicle 95 of Fig. 1.

It is to be noted that in connection with the constructions of Figs. 6 and 7 the towing stresses are transmitted solely from one pipe section to another through the universal joints connecting the individual tow bar lengths. At each pipe length the towing stresses are carried to the leading spider by means of the pin 105 or other similar arrangement which forms an abutment of the tow bar with such leading spider, the individual pipe itself carries the towing stresses to the saddles 106 and hence to the stub axles and the wheels mounted thereon.

Various changes may be made in the details of the construction without departing from the spirit or scope of the invention as defined by the appended claims.

I claim:

1. In a device as described, a connected series of individual pipes having an end to end connection for flowing of a fluid therethrough, a towing means extending longitudinally of the series of pipes and having a connection to each pipe for towing each pipe whereby the towing stresses are carried by the towing means.

2. In a device as described, the combination of a connected series of individual pipes for transmitting fluid therethrough, a towing means having a connection to each individual pipe whereby the towing stresses are transmitted from the said towing means to each individual pipe but not from one pipe to the next adjacent pipe.

3. In a device as described, the combination of a connected series of individual pipes, adjacent pipes having a flexible connection, the pipes and the connections being adapted for flow of a fluid therethrough, a towing means having a connection to each pipe and a flexible joint adjacent the connections of the pipes whereby the towing stresses exerted at one end of the series is conveyed through the towing means and to each individual pipe without the towing stresses being communicated from one pipe to the adjacent pipe.

4. In a device as described and claimed in claim 3, a supporting carriage structure having a connection to each individual pipe whereby the series of pipes may be positioned above the ground level for transportation.

5. In a device as described, the combination of a series of individual pipes, adjacent pipes having a flexible connection for transmission of fluid through the pipes and the connections, a towing means extending longitudinally through the pipes and the connections, said towing means having a towing connection to each individual pipe, the towing means also having flexible joints located in the said flexible connections, the said flexible connections between the pipes being of a type through which no towing stresses are transmitted from one pipe to the next pipe.

6. In a device as described and claimed in claim 5, each pipe having a supporting carriage or dolly structure positioned much closer to the rear end of each pipe than to the forward end whereby in making turns in towing the series of pipes the said carriages follow substantially in the track of the leading carriage.

7. In a device as described, the combination of a series of individual pipes, flexible connections for angular movement of the adjacent pipes of the series connecting adjacent pipes for transmission of fluid through the connections and the pipes, a longitudinally extending tow bar assembly extending substantially centrally through the series of pipes and the connections and having a universal joint at each connection, means for attaching a portion of the tow bar to the pipe through which it extends whereby towing stresses are carried entirely by the tow bar and its universal joints to each pipe length but no stresses are transmitted from one pipe length to the adjacent pipe length through the flexible connection.

8. In a device as described and claimed in claim 7, a carriage structure having an axle with wheels, each axle being connected to an individual pipe length, means interconnecting each axle and the portion of the tow bar extending through the pipe having the axle and thereby transmitting the towing stresses from the tow bar to the axle, the pipe length and the wheels.

9. In a device as described and claimed in claim 7, each individual pipe having a spider construction secured thereto with means for guiding the tow bar through the said spider whereby angular movement of the tow bar is communicated through the spider to the individual pipe.

10. In a device as described, the combination of a series of individual pipes, wheels connected to each pipe for supporting the same above the ground surface and for movement thereover, a coupling connection between individual pipes for transmission of fluid through the pipes and coupling connections, a spider construction positioned adjacent each end of each pipe, a tow bar extending through each pipe and each spider, universal joints connecting the tow bars of each pipe substantially within the coupling, the tow bar on the forward pipe having means for towing the series of pipes by a towing vehicle, means to interconnect each length of tow bar with the pipe through which it extends whereby towing stresses are communicated through the tow bars and the universal joints, the said couplings between the pipes having no towing stresses in towing the series of pipes.

11. In a device as described and claimed in claim 10, the wheels being connected to each pipe by an axle extending through each pipe, a leakproof connection at each axle and the wheels being mounted on the ends of the axle.

12. In a device as described and claimed in claim 10, means forming an end closure at one end of the series of pipes, means for supplying water at the other end of the series and each length of pipe having valved outlets for water distribution.

13. In a device as described and claimed in claim 10, each individual pipe having a water outlet fitting adjacent the bottom, a pivotally mounted discharge pipe connected to each outlet fitting and having a pivotal connection thereto, the axis of the pivot being parallel to the axis of the pipe whereby the outlet pipe may swing in a plane transverse to the axis of the pipe.

14. In a device as described, a transportable pipe having an axle with wheels thereon, the axle being transverse to the longitudinal axis of the pipe, a plurality of spiders in the pipe, a tow bar extending longitudinally through the pipe, means interconnecting the tow bar with one of the spiders for towing the pipe moving forwardly on the wheels, the tow bar having a universal joint for connection to an adjacent tow bar.

15. In a device as described, a transportable pipe having a pair of saddles, each having an axle with a wheel, the axles being transverse to the longitudinal axis of the pipe, a tow bar extending through the pipe, a structural means in the pipe for centering the tow bar and an interconnection between the tow bar and one of the centering means for transmitting pulling stresses from the tow bar to the pipe and hence to the wheels.

16. In a device as described, a transportable pipe having an axle with wheels, means rigidly connecting the axle to the pipe, such axle being transverse to the longitudinal axis of such pipe, a tow bar extending longitudinally through the pipe, a supporting means in the pipe and having a connection to the tow bar for towing the pipe.

17. In a device as described, a transportable pipe having a pair of saddles, each with a hub section secured to the outside of the pipe, a wheel axle mounted in the hubs with wheels thereon, the axle being transverse to the longitudinal axis of the pipe, a tow bar extending through the pipe, means interconnecting the tow bar and the pipe for transmitting towing stresses from the bar to the pipe and hence to the wheels.

18. In a device as described, a transportable pipe having a pair of saddles, each with a hub connected to opposite sides of the pipe, wheels, means for mounting the wheels in the hubs of the saddles, the axis of the wheels being transverse to the longitudinal axis of the pipe, a tow bar extending longitudinally through the pipe, spider structures connected to the pipe and centering the tow bar and an interconnecting means between the tow bar and at least one of the spider structures whereby the towing stress longitudinally of the tow bar is transmitted to the spider structure and thence to the pipe and wheels.

19. In a device as described, a transportable pipe having a pair of saddles with hubs connected on opposite sides of the pipe, an axle extending through the hubs of the saddle and through the pipe, wheels on the axle, a leak preventing means on the axle operative with the hubs, a tow bar extending longitudinally of the pipe, means interconnecting the tow bar and the axle inside the pipe for transmitting towing stresses on the tow bar to the axle and hence to the pipe and wheels.

20. In a device as described and claimed in claim 10, the wheels being mounted on stub axles, means securing said stub axles to opposite sides of the pipe, the stub axles being in alignment and being transverse to the longitudinal axis of the pipe.

MAURICE AARON BALAAM.